US012712867B2

(12) United States Patent
Russell

(10) Patent No.: US 12,712,867 B2
(45) Date of Patent: Aug. 18, 2026

(54) AUTHENTICATION ENGINE(S) FOR MONITORING ACTIONS ASSOCIATED WITH NETWORK FUNCTIONS

(71) Applicant: Oracle International Corporation, Redwood City, CA (US)

(72) Inventor: Travis Earl Russell, Clayton, NC (US)

(73) Assignee: Oracle International Corporation, Redwood City, CA (US)

( * ) Notice: Subject to any disclaimer, the term of this patent is extended or adjusted under 35 U.S.C. 154(b) by 118 days.

(21) Appl. No.: 18/743,868

(22) Filed: Jun. 14, 2024

(65) Prior Publication Data

US 2025/0385896 A1 Dec. 18, 2025

(51) Int. Cl.
*H04L 9/40* (2022.01)

(52) U.S. Cl.
CPC ............ *H04L 63/08* (2013.01); *H04L 63/102* (2013.01); *H04L 63/105* (2013.01)

(58) Field of Classification Search
None
See application file for complete search history.

(56) References Cited

U.S. PATENT DOCUMENTS

2018/0288027 A1* 10/2018 Gulbrandsen ........... H04L 63/10
2020/0151338 A1* 5/2020 Silverstone ............. H04L 63/20
2022/0147634 A1* 5/2022 Silverstone ........... G06F 21/602
2023/0370442 A1* 11/2023 Dykes .................. H04L 63/105

* cited by examiner

*Primary Examiner* — Khoi V Le

(57) ABSTRACT

Various embodiments of the present technology generally relate to systems and methods for providing an authentication engine for monitoring interactions associated with network functions. In an example, an authentication engine may determine a request from a client device that includes a requested action associated with a network function within a network. The client device may have authentication credentials for performing the requested action. The authentication engine may determine a deviant intent based on the requested action, such as determining the requested action being outside a range of normal activity and/or associated with an active network function. Based on the deviant intent, the authentication engine may generate a subsequent authorization requirement that is required to be completed for the client device to perform the requested action.

20 Claims, 6 Drawing Sheets

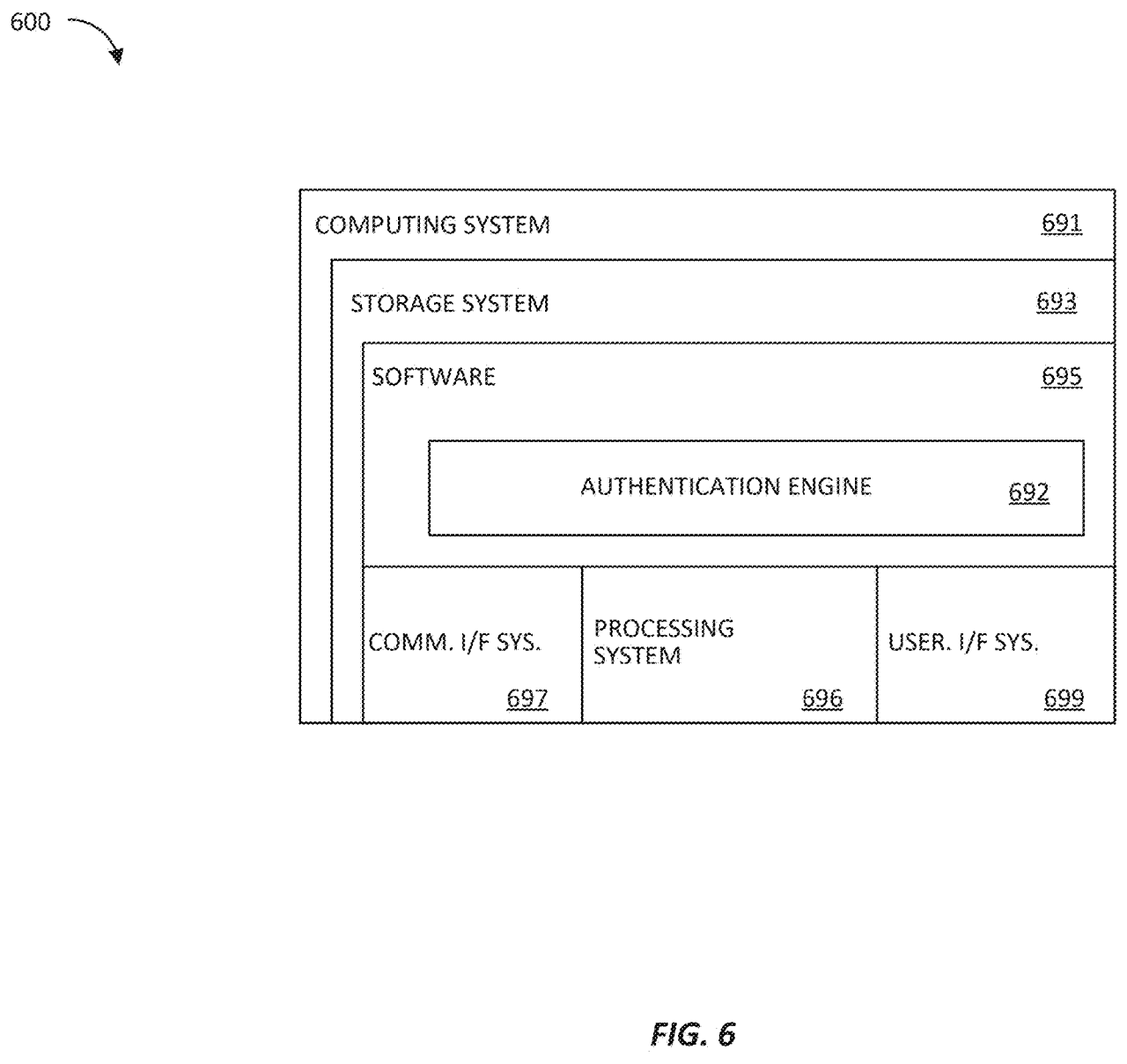

600

COMPUTING SYSTEM 691

STORAGE SYSTEM 693

SOFTWARE 695

AUTHENTICATION ENGINE 692

COMM. I/F SYS. 697

PROCESSING SYSTEM 696

USER. I/F SYS. 699

FIG. 6

AUTHENTICATION ENGINE(S) FOR MONITORING ACTIONS ASSOCIATED WITH NETWORK FUNCTIONS

TECHNICAL FIELD

Various embodiments of the present technology generally relate to managing and providing security measures for safeguarding a virtualized network, such as a 5G network. More specifically, embodiments of the present technology relate to systems and methods for providing an authentication engine for monitoring interactions with network functions, including identifying deviant intents.

BACKGROUND

Network attacks are becoming more prevalent as applications and services are increasingly supplied by remote or virtual systems. This shift in infrastructure has created new vulnerabilities, particularly through the exploitation of stolen authentication credentials. Some network attacks involve nefarious actors using these valid credentials to gain authorized access to network infrastructures. For example, attackers might obtain credentials through phishing schemes or data breaches, allowing them to infiltrate systems without raising immediate suspicion.

Once inside the network, these attackers can escalate their privileges and move laterally throughout the system, making it difficult to identify them since they appear as legitimate users. These intruders can cause significant damage by shutting down network functions, altering critical parameters, and disrupting services. They might also exfiltrate sensitive data, leading to information breaches, or implant malware that can compromise the entire network. Traditional security measures, such as firewalls and basic intrusion detection systems, often fall short in detecting and preventing these sophisticated intrusions. In particular, traditional security measures often fail to detect these types of network attacks because the attacker uses valid credentials to enter the system. In other words, traditional security measures are unable to readily detect a valid user from a nefarious user when the nefarious user employs valid credentials.

Accordingly, there exists a need for improved systems and techniques that can detect a nefarious user, even when that user possesses valid credentials, and take steps to prevent the nefarious user from taking further action with respect to network functions. Specifically, there exists a need for authentication engine(s) as provided herein for monitoring interactions with network functions.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing an authentication engine to monitor interactions associated with network functions. In an aspect, the authentication engine may identify a request from a client device. The request may include a requested action for which the client device contains authentication credentials to perform. The requested action may also be associated with one or more network functions within a network, such as a 5G network.

Responsive to receiving the request, the authentication engine may determine whether the requested action contains a deviant intent. To determine a deviant intent, the authentication engine may determine whether the requested action is outside a range of normal activity for the client device or user associated with the respective authentication credentials. As will be described in greater detail below, to determine whether a requested action is outside the scope of normal activity, the authentication engine may determine a user profile associated with the respective authentication credentials and then determine normal activity based on the user profile. In some embodiments, the authentication engine may include a machine-learning model that is trained on historical actions of the respective authenticated user or users having similar permissions level. Using the machine-learning model, the authentication engine may determine whether the requested action is outside the range of normal activity for the respective user.

The authentication engine may also determine whether the requested action is for an active network function. For example, the authentication engine may determine a state of the network function(s) associated with the requested action, such as requested a state for the network function(s) from a network monitoring system. Based on the state of the network function(s) and/or whether the requested action is outside the scope of normal activity, the authentication engine may determine whether there is a deviant intent.

If the authentication engine determines that there is deviant intent for the requested action, the authentication engine may generate a subsequent authorization requirement. For example, the authentication engine may determine a supervisor or manager for the respective authenticated user and transmit a subsequent authorization to them. If the supervisor or manager approves of the subsequent authorization, then the authentication engine may grant the respective authenticated user permission to perform the requested action. However, if the supervisor or manager denies the subsequent authorization, then the authentication engine may deny the respective authenticated user from performing the requested action.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 6 shows an example computing device suitable for providing an authentication engine and its related functions, according to an embodiment herein.

Figure 1:
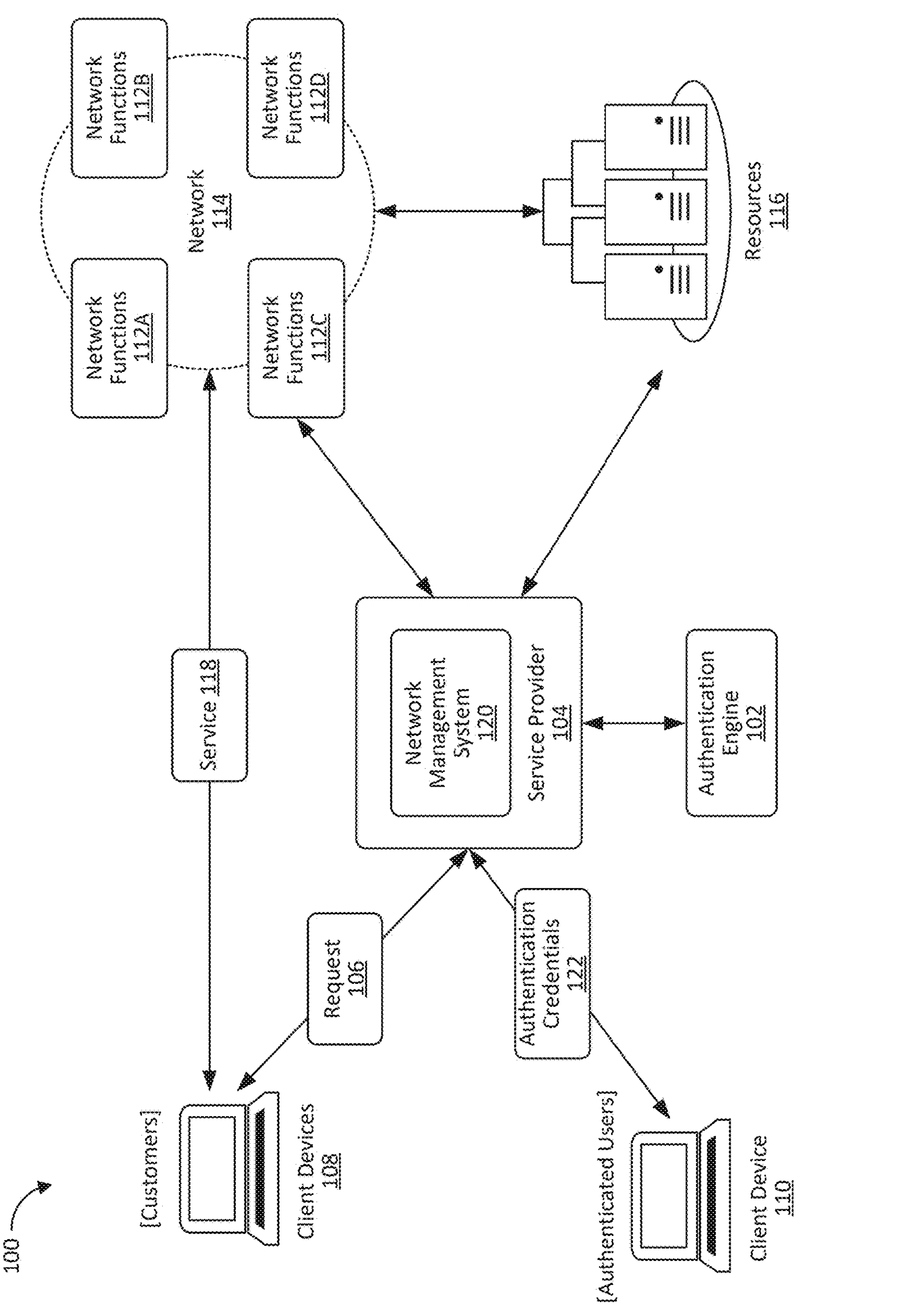
FIG. 1 illustrates an example operational environment in which an authentication engine is implemented to monitor interactions associated with network functions, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Network attacks are increasingly common in today's digital landscape, posing significant threats to various network infrastructures. With the advent of 5G networks, the potential for such attacks has escalated, given the unprecedented levels of connectivity and data transmission speeds they offer. These attacks encompass a wide range of malicious activities, from infiltrating systems to stealing sensitive information and disrupting critical services. As 5G networks continue to proliferate and integrate with various sectors such as healthcare, finance, and transportation, the stakes are higher than ever before.

One type of network attack involves a nefarious actor gaining unauthorized access to a network's infrastructure using valid credentials. These credentials could be obtained through various means, such as phishing schemes, social engineering tactics, or exploiting vulnerabilities in third-party systems. Once inside the network, the attacker can masquerade as a legitimate user, making it challenging to detect their presence. With access to the network's infrastructure, the attacker can not only execute a range of malicious activities, including stealing sensitive data, altering configurations, or disrupting operations but also increase permission levels associated with the credentials, exacerbating the extent of potential damage.

Within the context of a 5G network, a nefarious actor with unauthorized access could execute various malicious activities with detrimental consequences. For instance, the actor might target active network functions responsible for managing traffic, such as the core network or radio access network components. By exploiting their access privileges, the actor could deploy destructive actions, such as deleting critical network functions. For example, they could target the session management function responsible for establishing and maintaining user sessions. Deleting this function would disrupt ongoing communication sessions, resulting in service outages for users connected to the network. Additionally, the actor could manipulate parameters within network functions to compromise network performance or integrity. For instance, they might alter Quality of Service (QOS) parameters to degrade service quality or modify security protocols to facilitate unauthorized access or data interception. These actions could have severe repercussions, leading to widespread service disruptions, compromised user privacy, and significant financial losses for network operators and service providers.

Current security measures often struggle to detect nefarious actors who gain access to network infrastructure using valid credentials. One primary reason is that these actors appear as legitimate users within the system, making it challenging for traditional security mechanisms to distinguish their activities from normal user behavior. For example, Intrusion Detection Systems (IDS) and Security Information and Event Management (SIEM) solutions typically rely on predefined signatures or patterns to identify potential threats. However, since the attacker is using valid credentials, their actions may not trigger these signatures, allowing them to operate undetected. Furthermore, the lack of comprehensive user behavior analytics makes it difficult to differentiate between legitimate and malicious activities. As a result, nefarious actors can exploit this gap in detection capabilities to carry out their attacks without raising suspicion. Additionally, the dynamic nature of network environments, particularly in 5G networks with their virtualized and software-defined infrastructure, further complicates detection efforts. Overall, the inability of current security measures to effectively identify and respond to insider threats poses significant challenges in mitigating the risks associated with unauthorized access to network infrastructure.

To address the shortcomings of conventional security measures against network attacks, example authentication engine(s) for monitoring interactions associated with network functions are provided herein. As will be described in greater detail below, in an example the authentication engine may identify a request for performing an action associated with a network function. For example, the request may be to perform an action, such as update parameters, manage, or delete a network function. The authentication engine provided herein may determine whether there is a deviant intent for the requested action, such as whether there is a nefarious actor behind the requested action.

To determine a deviant intent, the authentication engine may determine a normal range of activity for a user profile associated with the valid credentials used to make the request. In some embodiments, the authentication engine may include a machine-learning model that is trained on historical actions made by the user profile and/or user profiles having similar permissions level to the requesting user profile. The authentication engine may compare the requested action to the range of normal activities to determine whether the requested action is within the scope of normal activity for the user profile. If the requested action is outside of the range of normal activity for the user profile, then the authentication engine may require additional authentication measures be performed before the requested action is allowed to be performed. For example, the authentication engine determines that the user profile has never requested or received a permission level increase and the requested action is for an increase in permissions level, then the authentication engine may flag the requested action as a deviant intent. As used herein, deviant intent may mean an intent that deviates from or does not follow trends or patterns present in previous actions associated with the user profile.

In some embodiments, the authentication engine may determine the deviant intent based on the network function interaction of the requested action. For example, if the requested action is to delete or otherwise impede the operation of a network function that is active, then the authentication engine may determine a deviant intent. As those skilled in the art readily appreciate, deleting an active network function that is responsible for managing network traffic could cause catastrophic action, such as leading to widespread service disruptions, compromised user experiences, and significant financial losses for both the network operators and users. As such, the authentication engine may flag requested actions that involve active network functions as deviant intents.

As will be expanded on below, the authentication engine provides an additional layer of authentication and monitoring that is not available and achievable by current security systems. For example, the authentication engine is able to detect deviant intent and deny requests that involve actions outside the scope of normal activity for a user or involve an active network function, even for a user having authenticated and authorized credentials. By flagging deviant intents and requiring subsequent authorization to perform the requested action, the authentication engine can safeguard against network attacks involving use of authenticated and valid credentials. As can be appreciated, preventing network attacks not only safeguards sensitive data and critical infrastructure but also ensures uninterrupted services, preserves user trust, and mitigates potential financial and reputational damages associated with security breaches.

Turning now to the Figures, FIG. 1 illustrates an example operational environment 100 in which an authentication engine 102 may be implemented to monitor interactions associated with network functions, according to an embodiment herein. As illustrated, the operational environment 100 includes a service provider 104 that provides one or more services to client devices 108. The client devices 108 may be consumers of the service provider 104. As such, when the client device 108, which may be a laptop or smartphone, transmits the request 106 to the service provider 104, such as a request to receive a service 118 within the service provider's 104 network. Responsive to receiving the request 106, the service provider 104 may initiate a series of orchestrated actions to furnish that request 106. That is, the service provider 104 may coordinate with various network functions 112A-D within a network 114 to fulfill the request 106.

In some embodiments, the network 114 may be a 5G network or a 5G core network. While the remaining discussion is with respect to the network 114 being a 5G network, it should be appreciated that the network 114 may be another type of telecommunication network, such as a 4G/LTE network, 3G network, a Wi-Fi network, a fixed broadband network, a satellite network, or a private enterprise network.

In some embodiments, the request 106 may be forwarded to the network 114 in which various network functions 112A-D collaboratively handle the request 106. The network functions 112A-D may manage authentication, session establishment, data transfer, and resource allocation, ensuring that the request 106 is processed seamlessly and securely. Examples of network functions 112A-D may include the Access and Mobility Management Function (AMF), User Plane Function (UPF), Session Management Function (SMF), Policy Control Function (PCF), Network Slice Selection Function (NSSF), Authentication Server Function (AUSF), and Network Exposure Function (NEF). It should be appreciated that while only four network functions 112A-D are provided for ease of illustration, the network 114 may include any number of network functions.

The service provider 104 may also dynamically provision resources 116 within the network's infrastructure to furnish the requested service 118. Utilizing advanced features like network slicing, the service provider 104 can create multiple virtual networks, each tailored to specific service requirements. This allows for the efficient allocation of resources 116, ensuring high performance and reliability for diverse service demands.

In some embodiments, the service provider 104 may include or coordinate with a network management system 120 to monitor network performance and resource utilization, making real-time adjustments to optimize service delivery. This network management system 120 can comprise various subsystems that monitor and coordinate the network 114 and its resources 116. For example, the network management system 120 may include an orchestration system that dynamically allocates resources to meet service demands and/or a network monitoring system that continuously tracks network performance metrics. By leveraging these systems, the service provider 104 ensures that the 5G network 114 operates efficiently, providing high-quality service to the client devices 108. It should be appreciated that while the network management system 120 is illustrated as part of the service provider 104, in some embodiments, the network management system 120 may be hosted by a third party and be separate from the service provider 104.

As noted above, in some embodiments, the network management system 120 includes a network monitoring system. In such cases, the network management system 120 may oversee the performance and status of the network functions 112A-D within the network 114. For example, the network management system 120 may continuously track various metrics such as latency, bandwidth usage, and error rates to ensure optimal network performance. Additionally, the network management system 120 may monitor the state of each network functions 112A-D, distinguishing between active, inactive, and degraded states. By employing advanced analytics and real-time data collection, the network management system 120 can detect anomalies, predict potential issues, and trigger automated responses to maintain network integrity. In some cases, the network monitoring system 120 may also provide detailed reports and dashboards that give network operators visibility into the operational status and health of the network functions 112A-D, enabling proactive management and timely interventions to address any disruptions.

To assist in managing the network 114 and addressing issues as they arise, the service provider 104 may collaborate with authenticated users, such as network operators. Authenticated users are individuals who possess the necessary authentication credentials, such as authentication credentials 122, granting them access to systems associated with the service provider 104 and/or the network management system 120. Example authentication credentials 122 may be or include usernames combined with passwords, biometric data such as fingerprints or facial recognition, two-factor authentication tokens generated by an application or sent via SMS, or any other system that verifies the identity of a user.

As those skilled in the art readily appreciate, authenticated users, particularly network operators, play a critical role in overseeing the functionality and performance of the network 114. For example, the authenticated users may be responsible for monitoring network traffic, identifying potential disruptions, and implementing solutions to maintain seamless connectivity. These users ensure that the network infrastructure operates efficiently, handle maintenance tasks, and perform upgrades as needed. Furthermore, authenticated users may analyze data to optimize network performance, respond to security threats, and provide technical support to resolve any network-related issues swiftly. In other words, authenticated users and their interactions with the network 114 are crucial for maintaining the integrity, reliability, and security of the network 114.

As noted above, authenticated users, such as network operators, are generally equipped with specialized credentials, herein referred to as valid or authentication credentials 122, that allow the authenticated users to interact with various network functions 112A-D within the network 114. That is, the authentication credentials 122 may grant authenticated users access to critical systems and interfaces, enabling them to perform a wide range of tasks essential for network maintenance and optimization. For instance, authenticated users may use their authentication credentials 122 to access the Network Function Virtualization (NFV) management interface, where they can deploy, scale, and manage virtual network functions (VNFs), such as the network functions 112A-D, to adapt to changing network demands. In another example, the authentication credentials 122 may allow authenticated users to interact with a network slicing management system, through which they can create and configure network slices tailored for specific applications or services, ensuring optimal performance and resource allocation. These interactions are crucial for maintaining the flexibility, efficiency, and robustness of the 5G network, allowing authenticated users to swiftly respond to issues and optimize the network 114 for various use cases.

As illustrated, an authenticated user may use the authentication credentials 122 via a client device 110 to interact with the network 114 and its related network infrastructure. Because the client device 110 possesses the authentication credentials 122, the service provider 104 (or any other authentication system) may determine that the client device 110 is an authenticated user. As such, the client device 110 may be granted access and the ability to interact with the network 114 and its related infrastructure. However, despite having the authentication credentials 122, the client device 110 may not always belong to a legitimate or authenticated user. In some cases, a nefarious actor might gain control of the client device 110, using the authentication credentials 122 to perform malicious activities or attacks on the network 114. For example, the user of the client device 110 may have stolen the authenticated credentials 122 and may use them to perform a network attack on the network 114.

Unauthorized access to the network 114 can lead to significant security breaches, including data theft, service disruption, and damage to the network infrastructure. When a nefarious actor gains access using stolen or compromised credentials, such as the authentication credentials 122, the nefarious actor can infiltrate sensitive areas of the network 114, extracting confidential information and potentially exposing it to unauthorized parties. Additionally, such actors can disrupt network services, causing outages that affect both consumers and businesses reliant on continuous connectivity. For example, nefarious actors may delete active network functions 112A-D, causing immediate and widespread network disruptions or outages. Deletion of an active network function 112A-D can dismantle critical services and functionalities, severely impacting the network's 114 performance and reliability, and leading to significant operational challenges and financial losses for the service provider 104. Furthermore, nefarious actors may execute attacks that damage the physical and virtual components of the network infrastructure, leading to costly repairs and extended downtime.

As noted above, conventional security measures often struggle to detect when a nefarious actor gains access to the network 114 using authentication credentials 122. Despite efforts to implement robust authentication mechanisms and intrusion detection systems, these actors can evade detection by mimicking a legitimate user and exploiting vulnerabilities in authentication protocols. Additionally, traditional security solutions may lack the capability to effectively monitor and analyze user activities in real-time, especially in complex network environments like those found in 5G networks. As a result, unauthorized access can go unnoticed for extended periods, allowing attackers to execute their malicious activities with impunity. Moreover, the increasing sophistication of cyber threats makes it challenging for conventional security measures to keep pace, leaving networks vulnerable to exploitation and compromise.

To address the shortcomings of conventional security measures in detecting nefarious actors masquerading as authenticated users, the authentication engine 102 may be provided. The authentication engine 102 may monitor authenticated users when they request to interact with the network 114, in particular, when they request interact with the network functions 112A-D. As will be expanded on in greater detail with respect to FIGS. 2-5, the authentication engine 102 may determine whether a requested action made by the client device 110 (e.g., a user appearing to be an authenticated user) is within the scope of normal activity associated with that user. Additionally, the authentication engine 102 may also determine whether the requested action involves an active network function 112A-D. As can be appreciated, network functions 112A-D that are managing network traffic or actively involved with providing services may cause substantial service issues if disrupted. As such, the authentication engine 102 may monitor requests from authenticated users that involve an active network function 112A-D.

When the authentication engine 102 determines a requested action is outside the range of normal behavior for a respective authenticated user and/or the requested action involves an active network function 112A-D, then the authentication engine 102 may determine a deviant intent for the requested action. The deviant intent may be an intent that deviants from the normal or standard intent or actions made by the authenticated user associated with the authentication credentials 122 or standard protocols used to manage the network 114 and its related infrastructure. For example, if the requested action is to delete an active network function 112A-D, the authentication engine 102 may determine this action to have a deviant intent because deleting an active network function is against standard operating procedure for the network 114.

When a deviant intent is determined, the authentication engine 102 may generate a subsequent authorization requirement. The subsequent authorization requirement may require additional authorization or authentication to be met before the client device 110 can perform the requested action. For example, the authentication engine 102 may generate and send a subsequent authorization to a manager or supervisor of the authenticated user associated with the authentication credentials 122 used to make the request. If the subsequent authorization is approved, then the authentication engine 102 may allow the client device 110 to perform the requested action. However, if the subsequent authorization requirement is denied, then the authentication engine 102 may deny the requested action. In some embodiments, beyond denying the requested action, the authentication engine 102 may also freeze the client device's 110 ability to access any parts of the network 114 and its related infrastructure. A notification that the subsequent authorization was denied may also be generated by the authentication engine 102 and transmitted to a respective party, such as a manager or supervisor to flag the client device 110 as a potential nefarious actor.

Figure 2:
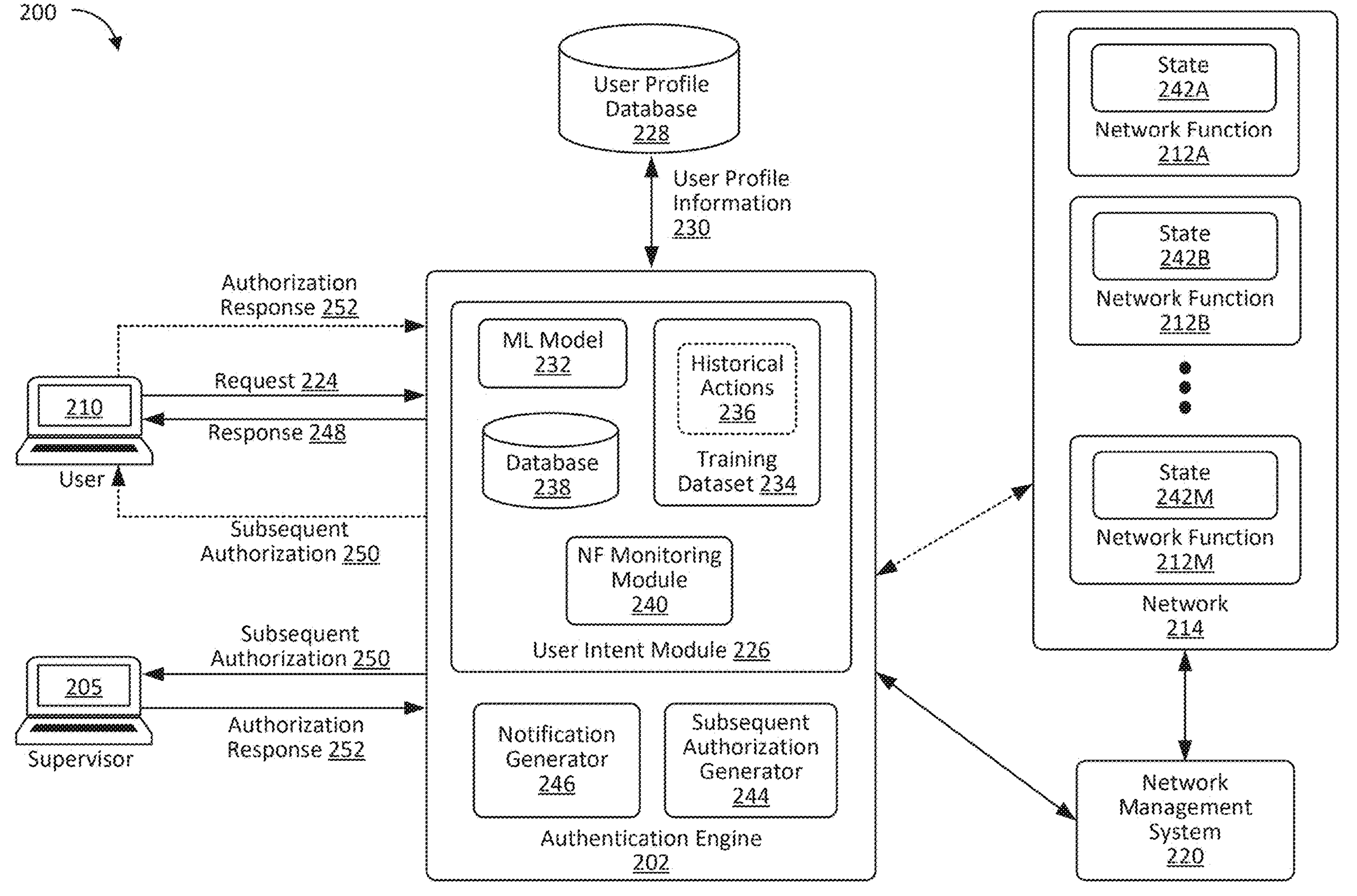
FIG. 2 illustrates an example operational environment in which an authentication engine is implemented to monitor a client device's interaction with a network, according to an embodiment herein.
Figure 3:
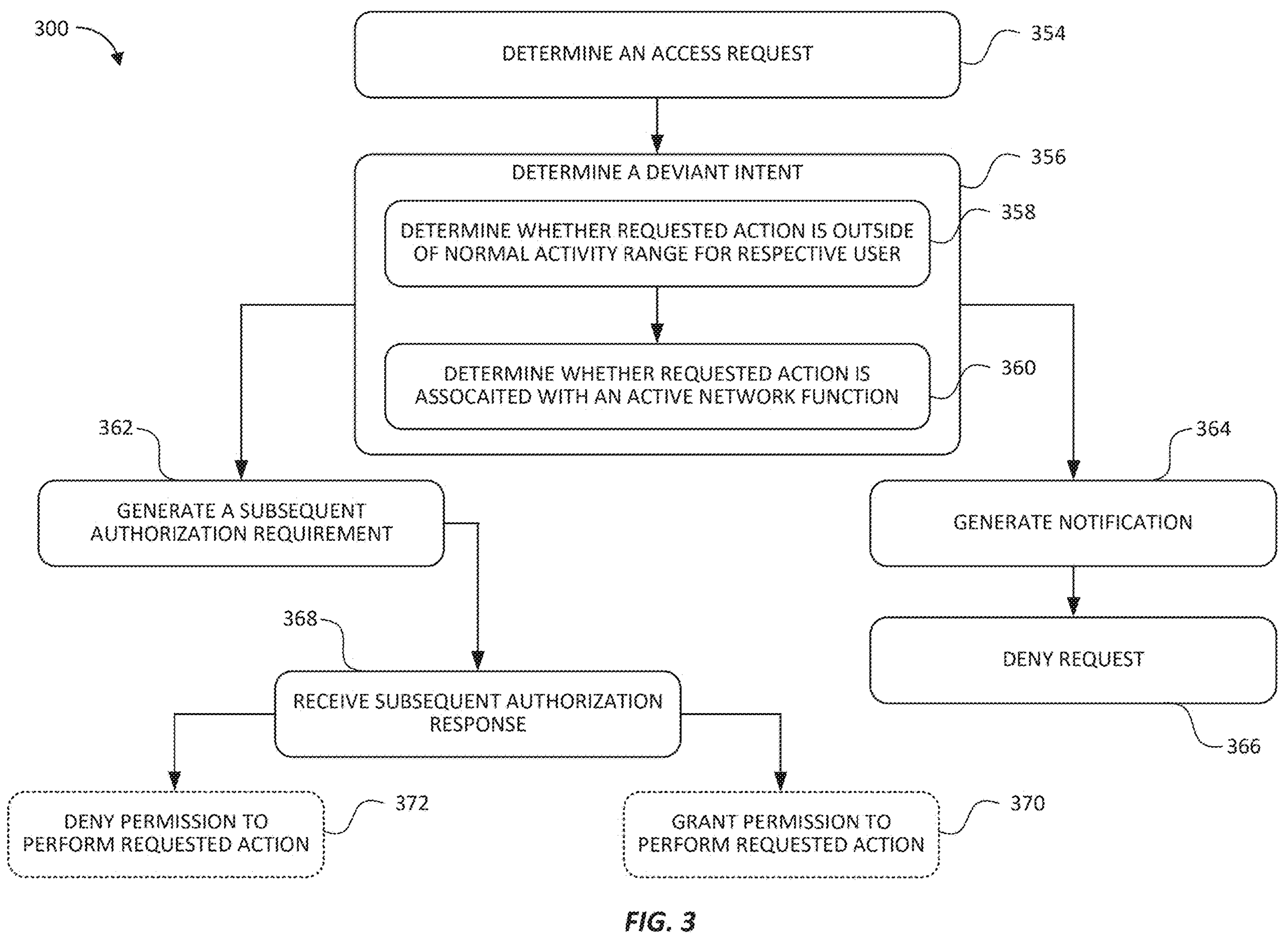
FIG. 3 illustrates an example authentication engine process, according to an embodiment herein.

Referring now to FIG. 2, an example operational environment 200 in which an authentication engine 202 is implemented to monitor a client device's 210 interaction with a network 214 is provided, according to an embodiment herein. For ease of explanation, FIG. 2 is described in conjunction with FIG. 3, which provides an example authentication engine process, in particular a process 300 for providing the authentication engine 202 and one or more of its functions, according to an embodiment herein. While FIG. 3 is described with relation to FIG. 2, it should be appreciated that components, elements, and steps from any other Figures described herein may be equally applicable.

The authentication engine 202, which may be the same or similar to the authentication engine 102, may receive a request, such as a request 224, from the client device 210 (354). The client device 210 may be the same or similar to the client device 110. As such, the request 224 may include a requested action that involves interacting with network 214. The network 214 may be the same or similar to the network 114, such as including network functions 212A-M. The request 224 may also include the authenticated credentials associated with an authenticated user. As such, the authenticated credentials may indicate that the client device 210 is authorized to perform the requested action.

Responsive to receiving the request 224, the authentication engine 202 may determine whether there is a deviant intent for the requested action (356). In particular, the authentication engine 202 may include a user intent module 226. The user intent module 226 may determine whether the requested action is within the scope or range of normal activity for the requesting user (358). To determine whether the requested action is within the range of normal activity for the user associated with the request 224, the user intent module 226 may query a user profile database 228 to determine user profile information 230 of the requesting user. That is, the authentication engine 202 may determine a user profile associated with the client device 210 based on the authentication credentials provided as part of the request. It should be appreciated that the request 224 may not include the authentication credentials in all cases, but instead may be associated with the authentication credentials in some manner. For example, the client device 210 may login using the authentication credentials and then make the request 224 when logged in.

When the user intent module 226 determines the user profile information 230 associated with the client device 210 (or user associated with the authentication credentials), the user intent module 226 may determine a range of normal activity based on the user profile information 230. For example, the user intent module 226 may include one or more artificial intelligence (AI) or machine-learning (ML) model(s) 232 that may determine a range of normal activity for the client device 210. The ML model 232 may be or include one or more supervised learning algorithms such as support vector machines or neural networks, unsupervised learning techniques such as clustering algorithms or autoencoders, semi-supervised learning methods combining labeled and unlabeled data, reinforcement learning for dynamic adaptation, deep learning architectures like recurrent neural networks (RNNs) or convolutional neural networks (CNNs), generative adversarial network (GANs) for synthetic data generation, and/or ensemble learning to improve overall performance by combining predictions from multiple models To determine the range of normal activity, the ML model 232 may be trained on a dataset 234. The authentication engine 202 may generate the dataset 234 based on historical actions 236 of one or more authenticated users associated with the network 214. The historical actions 236 may be interactions or actions that authenticated users, including the authenticated user associated with the client device 110, made during a previous time period. The previous time period may be the time period for which a respective user was an authenticated user. Using the dataset 234, the ML model 232 may be trained by iteratively exposing the ML model 232 to examples of historical actions 236 associated with a respective authenticated user or authenticated users having certain permissions level. As those skilled in the art readily appreciate, the ML model 232 may learn patterns and relationships within the dataset 234 to generate a range of normal activity for each authenticated user.

The range of normal activity may include activities or actions that an authenticated user typically performs. For example, the range of normal activity may include monitoring network traffic, configuring network devices, troubleshooting network issues, conducting routine maintenance, such as software updates, implementing security measures, and the like. As can be appreciated, depending on the authenticated user's role, the scope or range of normal activities may vary. As such, the ML model 232 may determine a range of normal activities on a user-by-user basis. In other embodiments, the ML model 232 may take into account the historical actions 236 of authenticated users having similar permissions levels when determining a range of normal activity for a respective user. For example, the ML model 232 may determine that authenticated users having a first permissions level rarely, if ever, perform certain actions, and instead, mainly perform a first range of activities. The ML model 232 may determine that authenticated users having a second permissions level perform the certain actions, while rarely performing the first range of activities.

As noted above, the ML model 232 may determine a range of normal activity for a respective user. Once determined, the range of normal activity may be saved in a database 238. Within the database 238, the range of normal activity may be associated with the respective user and/or other authenticated users having similar permission levels. As can be appreciated, as authenticated users continue to interact with the network 214, the authentication engine 202 may incorporate these interactions into the historical actions 236, which in turn may be used to update the range of normal activity associated with each respective authenticated user.

To determine a deviant intent for the requested action, the user intent module 226 may compare the requested action against the range of normal activity associated with the client device 210 (or the respective authenticated user associated with the client device 210). If the requested action is within the scope of normal activity, then the user intent module 226 may determine no deviant intent. However, if the user intent module 226 determines that the requested action is outside the range of normal activity for the client device 210, then the user intent module 226 may determine a deviant intent. In other words, the user intent module 226 may determine that the requested action deviates from the range of normal activity for the requesting user.

In some embodiments, to determine the deviant intent, the authentication engine 202 may also determine whether the requested action involves an active network function 212A-M (360). As noted above, there may be limited circumstances in which an authenticated user may interact with an active network function 212A-M. As such, any actions involving an interaction with an active network function 212A-M may indicate activity that deviates from standard protocols or procedures, such as nefarious activity.

To determine whether the requested action involves an active network function 212A-M, the authentication engine 202 may determine the network function involved in the request 224 and determine a state of that network function. For example, if the request 224 involves the network function 212A, then the authentication engine 202 may determine the state 242A of the network function 212A. In some embodiments, the authentication engine 202 may include a network function (NF) monitoring module 240 that determines the state of the network functions 212A-M. In such examples, the NF monitoring module 240 may query a network management system 220, which may be the same or similar to the network management system 220 to determine the state of the network functions 212A-M. In other examples, the NF monitoring module 240 may determine the state of the network functions 212A-M itself, such as by including a network monitoring system that continuously monitors the state and health of the network functions 212A-M. As can be appreciated, the NF monitoring module 240 may periodically determine the state of the network functions 212A-M or may continuously determine the state of the network functions 212A-M, depending on the scenario.

If the NF monitoring module 240 determines that the state 242A of the network function 212A is inactive or degraded, then the authentication engine 202, in particular the user intent module 226, may determine that the requested action does not contain deviant intent. However, if the state 242A of the network function 212A is active, then the user intent module 226 may determine that the requested action may have deviant intent because, as noted above, there are limited circumstances in which actions are taken with respect to an active network function.

It should be appreciated that while the discussion herein involves determining an active state for a network function, the authentication engine 202 may determine deviant intent based on different states and/or requested actions. For example, the authentication engine 202 may determine a deviant intent based on the requested action being an action to delete the network function 212A, regardless of the state 242A. This may be especially true if the authentication engine 202 determines that deleting network functions is outside the range of normal activities associated with the client device 210.

If the authentication engine 202 determines a deviant intent, by determining one or both of the requested action falling outside of the range of normal activity or the requested action involving an active network function, then the authentication engine 202 may generate a subsequent authorization requirement (362). For example, the authentication engine 202 may include a subsequent authorization generator 244 that generates the subsequent authorization requirement. The subsequent authorization requirement may include a subsequent authorization 250 that is required to be approved by another user or system, such as a supervisor, manager, group, or department. As can be appreciated, the subsequent authorization 250 may include information relating to the requested action, along with any network functions that may be impacted if the requested action is performed. In some embodiments, the subsequent authorization 250 also include information relating to the deviant intent, such as indicating that the requested action is outside the range of normal activity of this user (e.g., "user does not typically perform the requested action") or the requested action involves an active network function (e.g., "this action involves an active network function."). The subsequent authorization 250 may request approval for the respective authenticated user to perform the requested action.

In some embodiments, the subsequent authorization generator 244 may generate the subsequent authorization requirement based on the user profile information 230 associated with the client device 210 (or the respective authenticated user). For example, the subsequent authorization generator 244 may determine a user who has supervisory responsibility over the client device 210 (e.g., or the respective authenticated user) based on the user profile information 230. The subsequent authorization generator 244 may then generate the subsequent authorization 250 requiring that the supervisory user grant authorization for the requested action to be performed.

In other embodiments, the subsequent authorization generator 244 may generate the subsequent authorization 250 based on a permissions level associated with the client device 210 or the requested action. For example, if the requested action involves the network function 212A, then the subsequent authorization generator 244 may determine a group or department that typically manages the network function 212A. From there, the subsequent authorization generator 244 may determine what authorization and who should provide the authorization for the requested action to be performed with respect to the network function 212A.

Once generated, the authentication engine 202 may transmit or otherwise provide the subsequent authorization 250 to a client device 205. The client device 205 may correspond to a user who supervises or manages the client device 210 and/or the network function associated with the requested action, here the network function 212A. Responsive to receiving the subsequent authorization 250, the client device 205 may review the subsequent authorization 250 and provide an authorization response 252, which may approve, deny, or require additional information for the requested action to be performed.

In some embodiments, instead of sending the subsequent authorization 250 to the client device 205, the subsequent authorization 250 may include additional authentication criteria to further validate the identity of the requested user. For example, the subsequent authorization 250 may include answering specific questions or providing another passcode.

In some embodiments, prior to, in parallel to, or subsequent to the authentication engine 202 transmitting the subsequent authorization 250 to the client device 205, the authentication engine 202 may generate a notification of the detected deviant intent (364). In particular, the authentication engine 202 may include a notification generator 246 that may generate a notification responsive to the authentication engine 202 determining the deviant intent. The notification may include an indication of why the deviant intent was detected, such as the requested action being outside the range of normal activity or the requested action involving an active network function 212A. The notification may be provided to the client device 210 to notify the respective user that the requested action requires subsequent authorization to be performed.

In some embodiments, in addition to the notification, the authentication engine 202 may also deny the client device 210 the ability to perform the requested action (366). For example, the authentication engine 202 may disable the client device's 210 ability to interact with the network 214 or freeze the client device's 210 account. As can be appreciated, if the deviant intent is determined this may indicate a malicious or nefarious actor. As such, it may be advantageous to disable the client device's 210 ability to interact with the network 214 until the subsequent authorization is approved.

As noted above, upon review of the subsequent authorization 250, the client device 205 may provide the authorization response 252 to the authentication engine 202. Responsive to receiving the authorization response (368), the authentication engine 202 may determine whether to permanently deny the requested action or grant permission to the client device 210 to perform the requested action. If the authorization response 252 indicates that the subsequent authorization was approved or granted, then the authentication engine 202 may grant permission for the client device 210 to perform the requested action (370). In contrast, if the authorization response 252 indicates that the subsequent authorization was denied, then the authentication engine 202 may deny permission for the client device 210 to perform the requested action (372).

Based on the authorization response 252 and the determination made by the authentication engine 202 of whether to approve or deny the response, the authentication engine 202 may generate and transmit a response 248. The response 248 may indicate whether the client device 210 is approved or denied to perform the requested action. And in cases where the authorization response 252 required additional information to approve the requested action, then the response 248 may include the additional information.

Figure 4:
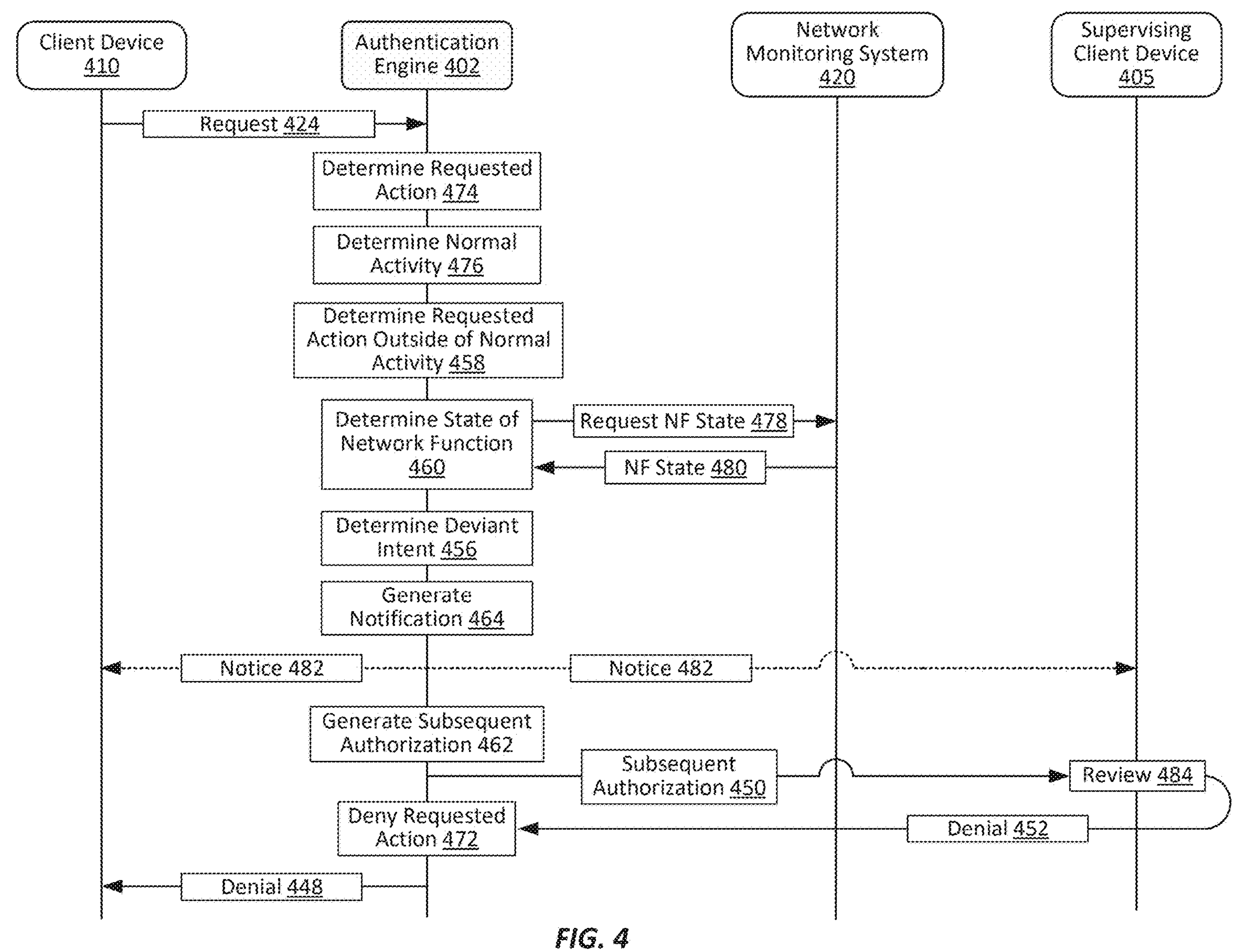
FIG. 4 illustrates an example flow for monitoring a request involving an interaction with a network function, according to an embodiment herein.

Referring now to FIG. 4, an example flow 400 for monitoring a request involving an interaction with a network function is provided, according to an embodiment herein. As shown, the flow 400 may include a client device 410, which may be the same or similar to the client device 210, transmitting a request, such as the request 242, to an authentication engine 402, which may be the same or similar to the authentication engine 202 (424). The request may include a requested action for which the client device 410 has authentication credentials to perform. Responsive to receiving the request, the authentication engine 402 may determine the requested action from the request (474). Determining the requested action may include determining if the requested action involves any interactions that are associated with one or more network functions with a network, such as the network functions 212A-M on the network 214. For example, if the requested action is to increase permissions level of the client device 410, the authentication engine 402 may determine that this involves an interaction associated with network functions as increasing permission level allow for increased management of network functions.

Once the authentication engine 402 determines that the requested action is associated with one or more network functions, the authentication engine 402 may determine whether the requested action is within the range of normal activity for the client device 410 or the user associated with the authentication credentials (476). For example, the authentication engine 402 may employ one or more ML models, such as the ML model 232, to determine whether the requested action is inside or outside of the range of normal activity for the client device 410. As noted above, this may include determining a user profile associated with the client device 410 or the respective authenticated user, determining a range of normal activity based on the user profile, and comparing the requested action to the range of normal activity. Following the above example, the authentication engine 402 may determine the client device 410 requesting to increase permissions level for the authentication engine is outside the range of normal activity. As such, the authentication engine 402 may determine that the requested action is outside of the range of normal activity (458).

Subsequently or simultaneously, the authentication engine 402 may determine a state of the network function(s) associated with the requested action (460). For example, if the requested action is to delete one or more network functions, the authentication engine 402 may determine the state for each of the network functions requested to be deleted. In some embodiments, as part of this determination, the authentication engine 402 may transmit a request for network function(s) state to a network monitoring system 420, which may be the same or similar to the network monitoring system 220 (478). Responsive to receiving the request for network function states, the network monitoring system 420 may provide the state of each of identified network functions (480). In some embodiments, instead of providing the request for the network function(s) state (478), the network monitoring system 420 may continuously provide information on the state and health of each respective network function with a respective network to the authentication engine 402.

Based on the state of the network function and/or the requested action falling outside the scope of normal activity, the authentication engine 402 may determine deviant intent (456). As can be appreciated, depending on the requested action, the authentication engine 402 may determine a deviant intent based on the requested action falling outside the scope of normal activity (e.g., requesting to increase permission level) or the state of the network function (e.g., deleting an active network function), or both determinations. For example, when the requested action does not directly involve a network function, such as the above example involving increasing permissions level, then the authentication engine 402 may not determine the state of a network function. Instead, the authentication engine 402 may determine the deviant intent based on the requested action being outside the range of normal activity.

Based on determining the deviant intent, the authentication engine 402 may generate a notification (464). The notification may be transmitted to the client device 410 and/or a supervising client device 405, which may be the same or similar to the client device 205 (482). The indication may include detection of the deviant intent, as described above. The authentication engine 402 may also generate a subsequent authorization requirement based on detecting the deviant intent (362).

Once generated, the authentication engine 402 may transmit a subsequent authorization to the supervising client device 405 (450). Responsive to receiving the subsequent authorization, which may be the same or similar to the subsequent authorization 250, the supervising client device 405 may review the subsequent authorization (484) and provide an authorization response. Here, the supervising client device 450 may deny the subsequent authorization (452). When the authentication engine 402 receives the denial, the authentication engine 402 may deny the requested action (472) and transmit a notification of the denial to the client device 410 (448), such as in the response 248.

Figure 5:
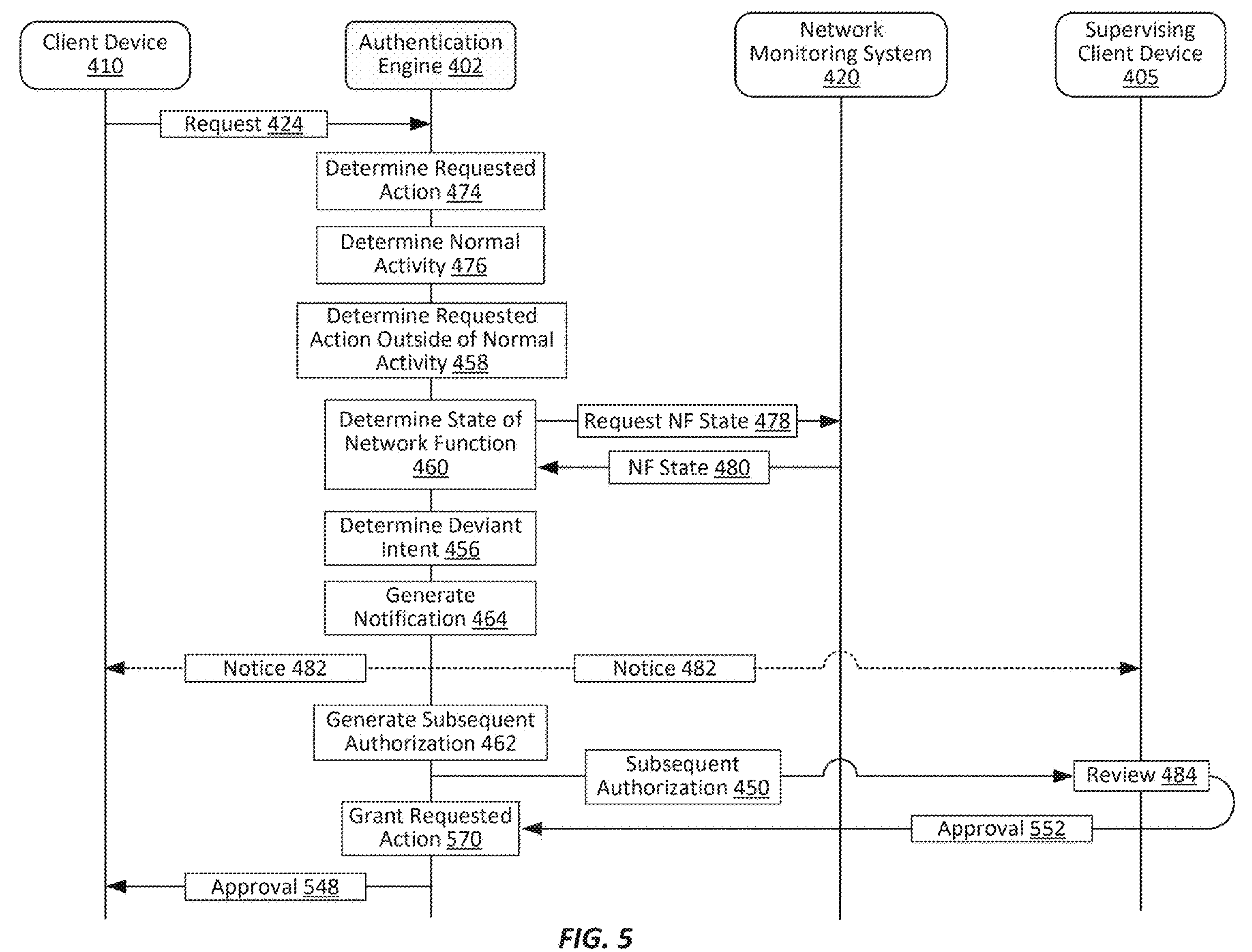
FIG. 5 illustrates another example flow for monitoring a request involving an interaction with a network function, according to an embodiment herein.

Referring nowt FIG. 5, another example flow 500 for monitoring a request involving an interaction with a network function is provided, according to an embodiment herein. In particular, the example flow 500 illustrates a similar process to the flow 400 except that the supervising client device 405 approves the subsequent authorization. As shown, when the supervising client device 450 reviews the subsequent authorization (484), the supervising client device 405 transmits approval of the subsequent authorization to the authentication engine 402 (552). Responsive to receiving the approval, the authentication engine 402 may grant permission for the client device 410 to perform the requested action (570). As part of granting permission to perform the requested action, the authentication engine 402 may notify the client device 410 of the approval (548), such as in the response 248.

Referring now to FIG. 6, is a diagram of a system 600 configured to implement an authentication engine, according to an embodiment herein. The system 600 may be an example of an apparatus including a computing apparatus 691 that is representative of any system or collection of systems in which the various processes, systems, programs, services, and scenarios disclosed herein may be implemented. For example, computing apparatus 691 may be an example authentication engine, such as the authentication engines 102, 202, or 402, a client device, such as the client device 110, 210, or 205, or any of the subcomponents depicted in environments 100 or 200 of FIGS. 1-2, respectively. Examples of computing apparatus 691 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 691 may be implemented as a single apparatus, system, or device or may be implemented in a distributed manner as multiple apparatuses, systems, or devices. Computing apparatus 691 may include, but is not limited to, processing system 696, storage system 693, software 695, communication interface system 697, and user interface system 699. Processing system 696 may be operatively coupled with storage system 693, communication interface system 697, and user interface system 699.

Processing system 696 may load and execute software 695 from storage system 693. Software 695 may include an authentication engine 692, which may be representative of any of the operations for providing an authentication engine or any of its related functions, as discussed with respect to the preceding figures. When executed by processing system 696, software 695 may direct processing system 696 to operate as described herein for at least the various processes, such as the process 300 or any of flows 400-500, operational scenarios, and sequences discussed in the foregoing implementations. Computing apparatus 691 may optionally include additional devices, features, or functionality not discussed for purposes of brevity.

In some embodiments, processing system 696 may comprise a micro-processor and other circuitry that retrieves and executes software 695 from storage system 693. Processing system 696 may be implemented within a single processing device but may also be distributed across multiple processing devices or sub-systems that cooperate in executing program instructions. Examples of processing system 696 may include general purpose central processing units, graphical processing units, application specific processors, and logic devices, as well as any other type of processing device, combinations, or variations thereof.

Storage system 693 may comprise any memory device or computer-readable storage medium readable by processing system 696 and capable of storing software 695. Storage system 693 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 693 may also include computer readable communication media over which at least some of software 695 may be communicated internally or externally. Storage system 693 may be implemented as a single storage device but may also be implemented across multiple storage devices or sub-systems co-located or distributed relative to each other. Storage system 693 may comprise additional elements, such as a controller, capable of communicating with processing system 696 or possibly other systems.

Software 695 (including the authentication engine 692 among other functions) may be implemented in program instructions that may, when executed by processing system 696, direct processing system 696 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 695 may include additional processes, programs, or components, such as operating system software, virtualization software, or other application software. Software 695 may also comprise firmware or some other form of machine-readable processing instructions executable by processing system 696.

In general, software 695 may, when loaded into processing system 696 and executed, transform a suitable apparatus, system, or device (of which computing apparatus 691 is representative) overall from a general-purpose computing system into a special-purpose computing system as described herein. Indeed, encoding software 695 on storage system 693 may transform the physical structure of storage system 693. The specific transformation of the physical structure may depend on various factors in different implementations of this description. Examples of such factors may include, but are not limited to, the technology used to implement the storage media of storage system 693 and whether the computer-storage media are characterized as primary or secondary storage, as well as other factors.

For example, if the computer-readable storage medium is implemented as semiconductor-based memory, software 695 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 697 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 691 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an authentication engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; an authentication engine comprising processor-executable instructions stored on the computer-readable storage medium; and one or more processors coupled to the computer-readable storage medium and configured to execute the processor-executable instructions to operate a, such that the processor-executable instructions, when executed by the one or more processors, direct the computing apparatus, to at least: identify a request from a client device, wherein: the request comprises a requested action associated with a network function of a plurality of network functions within a network; and the client device comprises authentication credentials for performing the requested action; determine a deviant intent based on the requested action; and generate a subsequent authorization requirement based on the deviant intent, wherein the subsequent authorization requirement is required to be completed for the client device to perform the requested action.

Example 2 is the computing apparatus of any previous or subsequent Example, wherein the processor-executable instructions to determine the deviant intent based on the requested action, when executed by the one or more processors, further direct the computing apparatus to: determine a user profile associated with the authentication credentials; determine a range of normal activity based on the user profile, wherein the range of normal activity is based on historical actions associated with the user profile; determine that that requested action is outside of the range of normal activity; and determine the deviant intent based on the requested action being outside of the range of normal activity associated with the user profile.

Example 3 is the computing apparatus of any previous or subsequent Example, wherein the processor-executable instructions to determine the deviant intent based on the requested action, when executed by the one or more processors, further direct the computing apparatus to: determine a state of the network function, wherein the state of the network function comprises an active state; and determine the deviant intent based on the active state of the network function.

Example 4 is the computing apparatus of any previous or subsequent Example, wherein the processor-executable instructions, when executed by the one or more processors, further direct the computing apparatus to: determine a first user profile associated with the authentication credentials; determine an permissions level based the first user profile; determine a plurality of user profiles comprising the permissions level; determine a plurality of historical actions associated with each of the plurality of user profiles; generate a dataset based on the plurality of historical actions; train a machine-learning model associated with the authentication engine using the dataset; and determine a range of normal activity for the first user profile based on training the machine-learning model on the dataset.

Example 5 is the computing apparatus of any previous or subsequent Example, wherein the processor-executable instructions, when executed by the one or more processors, further direct the computing apparatus to: deny the requested action associated with the network function based on the deviant intent; generate a notification of the deviant intent; and transmit the notification of the deviant intent to second client device.

Example 6 is the computing apparatus of any previous or subsequent Example, wherein the processor-executable instructions, when executed by the one or more processors, further direct the computing apparatus to: receive an indication that the subsequent authorization requirement is completed; generate a notification indicating approval to perform the requested action associated with the network function; and transmit the notification to the client device.

Example 7 is the computing apparatus of any previous or subsequent Example, wherein the processor-executable instructions, when executed by the one or more processors, further direct the computing apparatus to: determine a state for one or more network functions of the plurality of network functions within the network; determine an active state for a subset of the one or more network functions; and determine that the subset of the plurality of network functions comprises the network function associated with the requested action.

Example 8 is a method comprising: determining, by an authentication engine, a request from a client device, wherein: the request comprises a requested action associated with a network function of a plurality of network functions within a network; and the client device comprises authentication credentials for performing the requested action; determining, by the authentication engine, a deviant intent based on the requested action; and generating, by the authentication engine, a subsequent authorization requirement based on the deviant intent, wherein the subsequent authorization requirement is required to be completed for the client device to perform the requested action.

Example 9 is the method of any previous or subsequent Example, wherein determining, by the authentication engine, the deviant intent based on the requested action comprises: determining, by the authentication engine, a user profile associated with the authentication credentials; comparing, by the authentication engine, the requested action to a range of normal activity based on the user profile; and determining, by the authentication engine, the deviant intent based on the requested action being outside the range of normal activity of the user profile.

Example 10 is the method of any previous or subsequent Example, wherein determining, by the authentication engine, the deviant intent based on the requested action comprises: determining, by the authentication engine, a state of the network function; and determining, by the authentication engine, the deviant intent based on the state of the network function.

Example 11 is the method of any previous or subsequent Example, wherein the method further comprises: monitoring, by the authentication engine, a state of the plurality of network functions within the network; determining, by the authentication engine, an active state for a subset of the plurality of network functions; and determining, by the authentication engine, that the subset of the plurality of network functions comprises the network function associated with the requested action.

Example 12 is the method of any previous or subsequent Example, wherein the method further comprises: determining, by the authentication engine, a user profile associated with the authentication credentials; determining, by the authentication engine, a plurality of historical actions associated with the user profile; training a machine-learning model associated with the authentication engine using the plurality of historical actions; and determining, by the authentication engine, a range of normal activity for the user profile based on training the machine-learning model on the plurality of historical actions.

Example 13 is the method of any previous or subsequent Example, wherein the method further comprises: receiving, by the authentication engine, a second request from the client device, wherein: the second request comprises a second requested action associated with a second network function of the plurality of network functions within the network; and the client device comprises the authentication credentials for performing the second requested action; determining, by the authentication engine, that the second requested action is within a range of normal activity for the client device; and granting, by the authentication engine, permission for the client device to perform the second requested action.

Example 14 is the method of any previous or subsequent Example, wherein the method further comprises denying, by the authentication engine, the requested action associated with the network function based on the deviant intent.

Example 15 is a computer-readable storage medium comprising processor-executable instructions configured to cause one or more processors to: receive, by an authentication engine, a request from a client device, wherein the request comprises: a requested action associated with a network function of a plurality of network functions within a network; and authentication credentials for performing the requested action; determine, by the authentication engine, a deviant intent based on the requested action; and require, by the authentication engine, a subsequent authorization to perform the requested action based on the deviant intent.

Example 16 is the computer-readable storage medium of any previous or subsequent Example, wherein the processor-executable instructions cause the one or more processors to further execute processor-executable instructions stored in the computer-readable storage medium to: receive, by the authentication engine, notification that the subsequent authorization requirement is completed; and notify, by the authentication engine, the client device of authorization to perform the requested action associated with the network function.

Example 17 is the computer-readable storage medium of any previous or subsequent Example, wherein the processor-executable instructions to determine, by the authentication engine, the deviant intent based on the requested action cause the one or more processors to further execute processor-executable instructions stored in the computer-readable storage medium to: determine, by the authentication engine, a user profile associated with the authentication credentials; compare, by the authentication engine, the requested action to a range of normal activity associated with the user profile, wherein the range of normal activity is based on historical actions associated with the user profile; and determine, by the authentication engine, the deviant intent based on the requested action being outside the range of normal activity.

Example 18 is the computer-readable storage medium of any previous or subsequent Example, wherein the processor-executable instructions to determine, by the authentication engine, the deviant intent based on the requested action cause the one or more processors to further execute processor-executable instructions stored in the computer-readable storage medium to: determine, by the authentication engine, that the network function is active; and determine, by the authentication engine, the deviant intent based on the network function being active and the requested action.

Example 19 is the computer-readable storage medium of any previous or subsequent Example, wherein the processor-executable instructions cause the one or more processors to further execute processor-executable instructions stored in the computer-readable storage medium to: determine, by the authentication engine, an permissions level based the authentication credentials; determine, by the authentication engine, one or more user profiles comprising the permissions level; determine, by the authentication engine, a plurality of historical actions associated with the one or more user profiles; and determine, by the authentication engine, a range of normal activity for the one or more user profiles based on training a machine-learning model within the authentication engine on the plurality of historical actions.

Example 20 is the computer-readable storage medium of any previous or subsequent Example, wherein the processor-executable instructions cause the one or more processors to further execute processor-executable instructions stored in the computer-readable storage medium to: receive, by the authentication engine, a second request from the client device, wherein the second request comprises: a second requested action associated with a second network function of the plurality of network functions within the network; and the authentication credentials for performing the second requested action; determine, by the authentication engine, that the network function is not active; and grant, by the authentication engine, permission for the client device to perform the second requested action.

What is claimed is:

1. A computing apparatus comprising:

a non-transitory computer-readable storage medium;

an authentication engine comprising processor-executable instructions stored on the non- transitory computer-readable storage medium; and one or more processors coupled to the non-transitory computer-readable storage medium and configured to execute the processor-executable instructions to operate a, such that the processor-executable instructions, when executed by the one or more processors, direct the computing apparatus, to at least:

identify a request from a client device, wherein:

the request comprises a requested action associated with a network function of a plurality of network functions within a network; and the client device comprises authentication credentials for performing the requested action;

determine a deviant intent based on the requested action by comparing the requested action to a range of normal activity for a user profile associated with the authentication credentials, the range of normal activity being generated by a machine-learning model trained on historical actions of one or more authenticated users; and generate a subsequent authorization requirement based on the deviant intent, wherein the subsequent authorization requirement is required to be completed for the client device to perform the requested action.

2. The computing apparatus of claim 1, wherein the processor-executable instructions to determine the deviant intent based on the requested action, when executed by the one or more processors, further direct the computing apparatus to:

determine a user profile associated with the authentication credentials;

determine the range of normal activity based on the user profile by applying the machine-learning model to historical actions of users having a same permissions level as the user profile;

determine that that requested action is outside of the range of normal activity; and determine the deviant intent based on the requested action being outside of the range of normal activity associated with the user profile.

3. The computing apparatus of claim 1, wherein the processor-executable instructions to determine the deviant intent based on the requested action, when executed by the one or more processors, further direct the computing apparatus to:

determine a state of the network function, wherein the state of the network function comprises an active state; and determine the deviant intent based on the active state of the network function.

4. The computing apparatus of claim 1, wherein the processor- executable instructions, when executed by the one or more processors, further direct the computing apparatus to:

determine a first user profile associated with the authentication credentials;

determine a permissions level based the first user profile;

determine a plurality of user profiles comprising the permissions level;

determine a plurality of historical actions associated with each of the plurality of user profiles;

generate a dataset based on the plurality of historical actions;

train the machine-learning model associated with the authentication engine using the dataset; and determine a range of normal activity for the first user profile based on training the machine-learning model on the dataset.

5. The computing apparatus of claim 1, wherein the processor-executable instructions, when executed by the one or more processors, further direct the computing apparatus to:

deny the requested action associated with the network function based on the deviant intent;

generate a notification of the deviant intent; and transmit the notification of the deviant intent to second client device.

6. The computing apparatus of claim 1, wherein the processor-executable instructions, when executed by the one or more processors, further direct the computing apparatus to:

receive an indication that the subsequent authorization requirement is completed;

generate a notification indicating approval to perform the requested action associated with the network function; and transmit the notification to the client device.

7. The computing apparatus of claim 1, wherein the processor-executable instructions, when executed by the one or more processors, further direct the computing apparatus to:

determine a state for one or more network functions of the plurality of network functions within the network;

determine an active state for a subset of the one or more network functions; and determine that the subset of the plurality of network functions comprises the network function associated with the requested action.

8. A method comprising:

determining, by an authentication engine, a request from a client device, wherein:

the request comprises a requested action associated with a network function of a plurality of network functions within a network; and the client device comprises authentication credentials for performing the requested action;

determining, by the authentication engine, a deviant intent based on the requested action by comparing the requested action to a range of normal activity for a user profile associated with the authentication credentials, the range of normal activity being generated by a machine-learning model trained on historical actions of one or more authenticated users; and generating, by the authentication engine, a subsequent authorization requirement based on the deviant intent, wherein the subsequent authorization requirement is required to be completed for the client device to perform the requested action.

9. The method of claim 8, wherein determining, by the authentication engine, the deviant intent based on the requested action comprises:

determining, by the authentication engine, a user profile associated with the authentication credentials;

determining, by the authentication engine, the range of normal activity for the user profile by applying the machine-learning model to historical actions associated with users having a same permissions level as the user profile; and determining, by the authentication engine, the deviant intent based on the requested action being outside the range of normal activity of the user profile.

10. The method of claim 8, wherein determining, by the authentication engine, the deviant intent based on the requested action comprises:

determining, by the authentication engine, a state of the network function; and determining, by the authentication engine, the deviant intent based on the state of the network function.

11. The method of claim 8, wherein the method further comprises:

monitoring, by the authentication engine, a state of the plurality of network functions within the network;

determining, by the authentication engine, an active state for a subset of the plurality of network functions; and determining, by the authentication engine, that the subset of the plurality of network functions comprises the network function associated with the requested action.

12. The method of claim 8, wherein the method further comprises:

determining, by the authentication engine, a user profile associated with the authentication credentials;

determining, by the authentication engine, a plurality of historical actions associated with the user profile;

training machine-learning model associated with the authentication engine using the plurality of historical actions; and determining, by the authentication engine, a range of normal activity for the user profile based on training the machine-learning model on the plurality of historical actions.

13. The method of claim 8, wherein the method further comprises:

receiving, by the authentication engine, a second request from the client device, wherein:

the second request comprises a second requested action associated with a second network function of the plurality of network functions within the network; and the client device comprises the authentication credentials for performing the second requested action;

determining, by the authentication engine, that the second requested action is within a range of normal activity for the client device; and granting, by the authentication engine, permission for the client device to perform the second requested action.

14. The method of claim 8, wherein the method further comprises denying, by the authentication engine, the requested action associated with the network function based on the deviant intent.

15. A non-transitory computer-readable storage medium comprising processor-executable instructions configured to cause one or more processors to:

receive, by an authentication engine, a request from a client device, wherein the request comprises:

a requested action associated with a network function of a plurality of network functions within a network; and authentication credentials for performing the requested action;

determine, by the authentication engine, a deviant intent based on the requested action by comparing the requested action to a range of normal activity for a user profile associated with the authentication credentials, the range of normal activity being generated by a machine-learning model trained on historical actions of one or more authenticated users; and require, by the authentication engine, a subsequent authorization to perform the requested action based on the deviant intent.

16. The non-transitory computer-readable storage medium of claim 15, wherein the processor-executable instructions cause the one or more processors to further execute processor-executable instructions stored in the non-transitory computer-readable storage medium to:

receive, by the authentication engine, notification that the subsequent authorization requirement is completed; and notify, by the authentication engine, the client device of authorization to perform the requested action associated with the network function.

17. The non-transitory computer-readable storage medium of claim 15, wherein the processor-executable instructions to determine, by the authentication engine, the deviant intent based on the requested action cause the one or more processors to further execute processor-executable instructions stored in the non-transitory computer-readable storage medium to:

determine, by the authentication engine, a user profile associated with the authentication credentials;

determine, by the authentication engine, the range of normal activity for the user profile by applying the machine-learning model to historical actions associated with authenticated users having a same permissions level as the user profile; and determine, by the authentication engine, the deviant intent based on the requested action being outside the range of normal activity.

18. The non-transitory computer-readable storage medium of claim 15, wherein the processor-executable instructions to determine, by the authentication engine, the deviant intent based on the requested action cause the one or more processors to further execute processor-executable instructions stored in the non-transitory computer-readable storage medium to:

determine, by the authentication engine, that the network function is active; and determine, by the authentication engine, the deviant intent based on the network function being active and the requested action.

19. The non-transitory computer-readable storage medium of claim 15, wherein the processor-executable instructions cause the one or more processors to further execute processor-executable instructions stored in the non-transitory computer-readable storage medium to:

determine, by the authentication engine, a permissions level based the authentication credentials;

determine, by the authentication engine, one or more user profiles comprising the permissions level;

determine, by the authentication engine, a plurality of historical actions associated with the one or more user profiles; and determine, by the authentication engine, a range of normal activity for the one or more user profiles based on training the machine-learning model within the authentication engine on the plurality of historical actions.

20. The non-transitory computer-readable storage medium of claim 15, wherein the processor-executable instructions cause the one or more processors to further execute processor-executable instructions stored in the non-transitory computer-readable storage medium to:

receive, by the authentication engine, a second request from the client device, wherein the second request comprises:

a second requested action associated with a second network function of the plurality of network functions within the network; and the authentication credentials for performing the second requested action;

determine, by the authentication engine, that the network function is not active; and grant, by the authentication engine, permission for the client device to perform the second requested action.

* * * * *